June 16, 1931.    C. A. BERTEL    1,810,100
METHOD OF AND APPARATUS FOR STORING AND HANDLING COTTON BALES
Filed Jan. 6, 1928
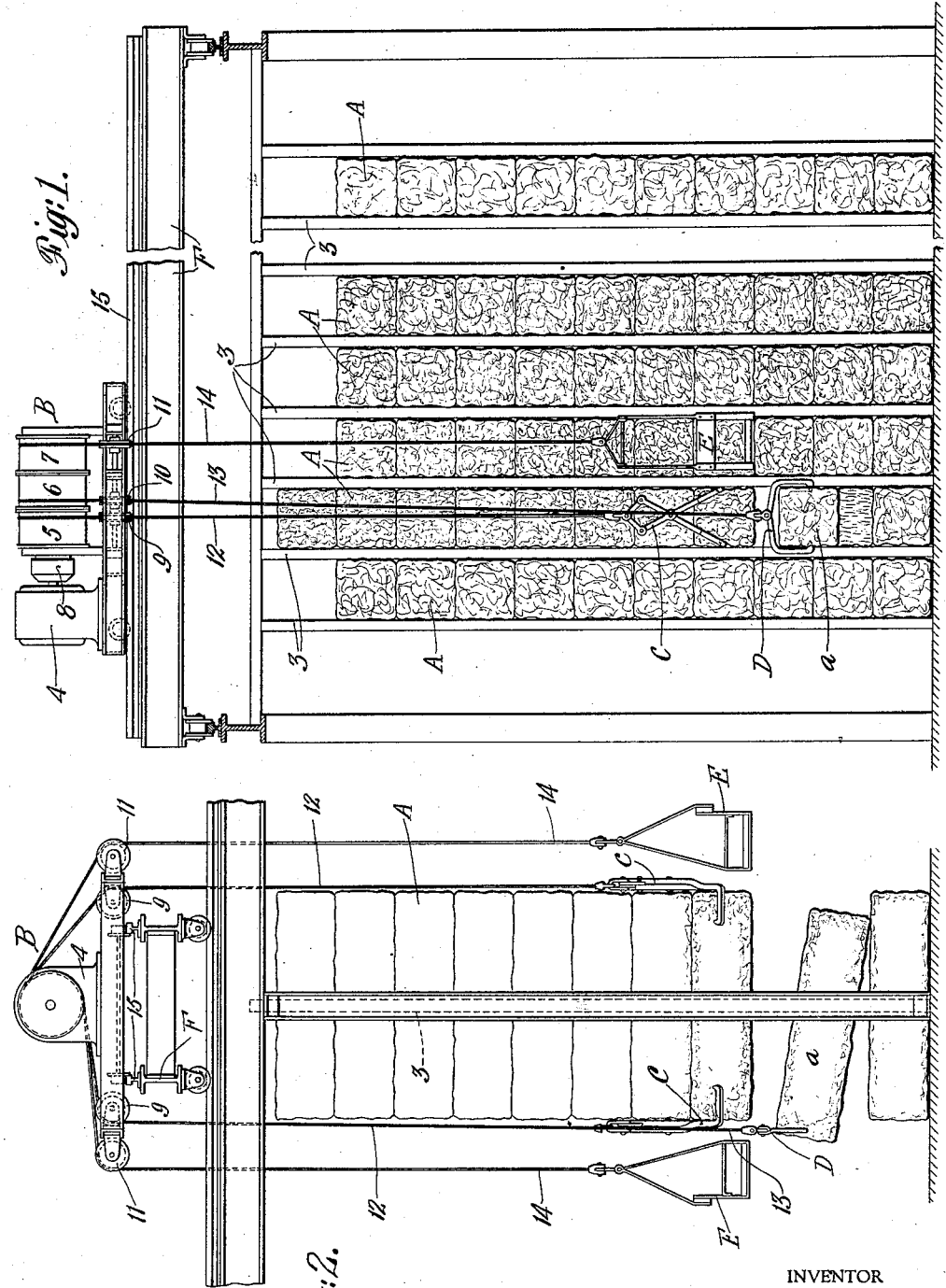
INVENTOR
C. A. Bertel
BY
ATTORNEY Patented June 16, 1931

1,810,100

UNITED STATES PATENT OFFICE

CHARLES ALVIN BERTEL, OF NEW ORLEANS, LOUISIANA

METHOD OF AND APPARATUS FOR STORING AND HANDLING COTTON BALES

Application filed January 6, 1928. Serial No. 244,800.

This invention relates to the method of and apparatus for storing and handling commodities.

The method and apparatus contemplated is particularly useful in cotton storage warehouses where the cotton is stored in bales.

Many difficulties, as will hereinafter appear, arise in removing bales of cotton from storage due to certain peculiar conditions which govern the selection of the particular bales to be taken out of storage, and I aim to obviate such difficulties. Although the invention is described in connection with cotton storage, it is to be understood that I contemplate its use in storing and handling other commodities, packages, and articles which may be advantageously stored and handled through the practice of the invention. The peculiar conditions referred to and certain methods heretofore employed will now be described as this is thought to be necessary to a clear and full understanding of the invention.

The general procedure in the cotton industry is to store the baled cotton in what may be termed public warehouses. The warehouses receive cotton from many firms and from many farmers who send the cotton to storage regardless of grade. The cotton is bought, however, according to grade or class, depending principally upon strength of fibre, length of fibre, color and the amount of foreign matter in the cotton, such as leaf and boll, etc. The textile mills to which the cotton is sold demand a particular grade, i. e., a certain combination of fibre, color, best suited to their needs. For example, a mill producing blue denim for overalls would require one grade, while a mill producing finely woven, high grade goods would require a very different grade. Obviously, therefore, the cotton is divided into numerous grades or classes.

In order that the owner of the cotton may know how his stock stands as to grade, it is customary to sample and label the bales, preferably by numbered tags corresponding to the various grades, when they are put in storage, so that when an order is received for cotton of a particular grade, the warehouse is ordered to ship bales from the owner's stock bearing number tags identifying such grade.

Owing to the great number of contributors of stock to such warehouses and to the great number of different grades of cotton, it is not attempted to group the bales of one owner at one place and those of another at another place, nor is it attempted to group them according to class, but, to the contrary, they are put into storage regardless thereof.

While some warehouses, due to the lowness of the buildings, employ a method of storing the bales on the head or end and only one bale high, the general trend is to construct the buildings of sufficient height to accommodate a considerable number of bales piled up on the side, in some cases the piles being as much as fourteen bales high. This latter method greatly increases over the former method, the storing capacity of a warehouse having a given floor space. This method, however, without provision to the contrary, has its shortcomings in that it is a difficult and time consuming operation to remove the bales from storage, particularly if the selected bale is at the bottom of the pile. By way of example, it has been found that in order to remove a bottom bale in a ten bale high pile, it is necessary to remove fifty-four bales to get at the selected bale. Where the piles are higher, the proportion increases until, in a fourteen bale high pile, as many as one hundred and four bales would have to be moved to get a bottom bale out. It will thus be seen that where two or three thousand selected bales are daily to be taken out of a stock of two or three hundred thousand bales, considerable expense is involved.

The primary object of my invention is to overcome the foregoing difficulties.

I propose to arrange the bales in a plurality of closely adjacent stacks, each stack comprising a plurality of superimposed bales, and to provide mechanism whereby the bale selected for removal may be relieved of the weight of the bales thereabove, whereby the selected bale may be readily pulled out of the stack, and whereby the bales above the one selected may be lowered after such bale has been removed to fill the gap left thereby.

I preferably arrange the stacks in a plurality of spaced ranges, leaving aisles of sufficient width between the ranges to enable the bales to be properly handled. Thus, by my method any selected bale may be removed without removing other bales and the great time and expense involved in former methods is avoided.

It is, therefore, an object of my invention to employ a method and to provide apparatus having the above characteristics.

A more specific object of my invention is the provision of mechanism whereby operators are enabled to effectively carry out the method described.

A further object is the provision of simple guide means for the stacks.

How the foregoing, together with such other objects and advantages as may hereinafter appear, or are incident to my invention, are realized, is illustrated in preferred form in the accompanying drawings, wherein—

Fig. 1 is a front elevational view of a plurality of bales stored in accordance with my invention and illustrating apparatus employed in carrying it out, the view being partly broken out to condense the figure, and Fig. 2 is an end view of Fig. 1 illustrating the second bale from the bottom of a stack in the act of being removed.

Referring to the drawings, I have illustrated a plurality of stacks A in this instance each comprising ten superimposed bales of cotton. The stacks are closely adjacent to one another and are preferably separated by means of uprights 3 which, to avoid fire from sparks due to friction, may be made of wood. The number of such stacks A comprising a range, so to speak, is determined by the size of the warehouse, as is the height of the range, and the number of ranges. The ranges are spaced apart a sufficient distance to enable the bales to be properly handled in putting them in and taking them out of storage.

Supported by suitable structural work, and preferably overhead, I have provided power mechanism B for operating the lifting grippers C, the pull-out tongs D and the supports or slings E for operators, the purpose of which will hereinafter fully appear. The power mechanism, in this instance, comprises a motor 4, three drums 5, 6 and 7, a clutch device 8, and suitable guide rollers 9, 10 and 11 for the cables 12, 13 and 14, respectively. The cables 12 are secured at one end to the drum 5 and at the other end to the lifting grippers C; the cable 13 is secured at one end to the drum 6 and at the other end to the pull out tongs D; and the cables 14 are secured at one end to the drum 7 and at the other end to the chairs or supports E. The clutch device 8 may be of any well known kind adapted to selectively clutch the drums 5, 6 and 7 to the motor shaft for drive.

Assuming now that the second bale $a$ from the bottom of the second stack from the left of a range is to be removed or taken out of storage, the procedure is as follows. The overhead power device B with the parts C, D and E suspended therefrom in a position above the top of the stacks is moved directly over one of the ranges as illustrated in Fig. 2, which movement is made possible by means of the crane F on which the power device is mounted. Next, the power device is moved crosswise of the crane on suitable tracks 15 to a position in which the lifting grippers C and the tongs D register with the stack containing the bale $a$ which is to be removed. The grippers C, tongs D and chairs E may now be lowered to their operative positions, the grippers and chairs being brought to the level of the bale above the bale $a$ and the tongs being brought opposite the end of the bale $a$. When the bale to be removed is too far above the floor to enable operators standing on the floor to conveniently apply the grippers and tongs, the operators take their place in the chairs which enables them to apply these devices and also assist in guiding the bale being removed. Once the grippers and tongs are applied, as illustrated in Fig. 2, the pull on the cable thereafter causes them to take a tight hold on their respective bales. Before clutching in the drum 6 which operates the pull-out tongs, the drum 5 is clutched in causing the lifting grippers C to raise the bales above the bale $a$ and thus relieve it of the weight of the raised bales. The drum 6 may now be clutched in and the bale $a$ pulled out. In this connection, the lifted bales are elevated a distance such that the angle at which the bale $a$ will engage the corner of the bale above it will be such that the bale $a$ will slide out on upward pull of the tongs D. After having removed the bale, the drum 5 is operated to lower the bales held up by the lifting grippers and the gap left by the removed bale is filled. By thus lowering these bales onto the remaining bales in the stack, or onto the floor of the warehouse, if the removed bale happened to be the bottom one, crumpling of the stack is prevented.

From the foregoing it will be seen that any selected bale may be quickly and easily removed without first removing other bales or disturbing their order, in consequence of which the speed of removing bales from storage may be very materially increased.

While I have described but one form of overhead power mechanism in which three separately controllable drums are employed, it is to be understood that other arrangements could be used without departing from the scope of my invention. For example, in some cases it might be desirable to have the lifting grippers and chairs operated from the same drum so as to move together and to have a separate motor device for the pull out tongs. I also contemplate means other than the overhead device described for lifting the bales clear of the one to be removed.

It may be desirable in some instances to dispense with the uprights 3 and to depend on the stacks remaining in upright or stack formation by themselves.

I claim:—

1. Apparatus for storing and handling baled commodities comprising a plurality of spaced uprights providing guides for a plurality of stacks of bales, said uprights being of such spacing as to accommodate a stack of bales therebetween composed of bales superimposed one above the other in vertical alignment, means for gripping a selected bale at both ends thereof, means for raising the gripped bale together with those thereabove so as to relieve the weight thereof from the bale below the one gripped, means engaging the bale below the one gripped at the end thereof adjacent the face of the stack across the plane of which the bale moves when it is pulled out of the stack, means operating on said engaging means to pull the selected bale from its stacked position, said gripping means being adapted to be lowered whereby the gripped bale may be lowered to take the stacked position previously occupied by the removed bale, and means for moving said gripping, raising and removing means into operative relation with the bales of any one of the plurality of stacks.

2. Apparatus for handling articles of like form and of considerable weight which are arranged in stacks each comprising a plurality of superimposed articles arranged in vertical alignment, including grippers adapted to be applied to the article above one selected for removal at opposite ends thereof, tongs adapted to be applied to the selected article at the end thereof which is adjacent the face of the stack across the plane of which the bale moves when it is removed from the stack, means for moving the grippers with the gripped article and the ones thereabove to a position clear of the article to be removed, and means for moving the tongs to a position which will remove the selected bale from its stack.

3. In apparatus for storing and handling baled commodities to be stored in a plurality of stacks each composed of bales superimposed one above the other in vertical alignment, the combination of a pair of grippers adapted to grip a selected bale adjacent the ends thereof, means for suspending said grippers one at each end of the bales of a stack, means for raising and lowering said grippers to bring them opposite the ends of any bale selected and for raising said bale with the bales thereabove to a position of suspension above the bales therebelow, tong means adapted to engage a selected bale at the end thereof adjacent the face of the stack from which removal is to take place and means for raising and lowering said tong means to bring it opposite said end of the bale immediately below the suspended bales and for pulling said bale out of the stack, the aforesaid suspended bales when lowered filling the gap left by the removed bale.

In testimony whereof I have hereunto signed my name.

CHARLES ALVIN BERTEL.